No. 882,094. PATENTED MAR. 17, 1908.
T. BOYD.
BAKING PAN.
APPLICATION FILED SEPT. 17, 1907.
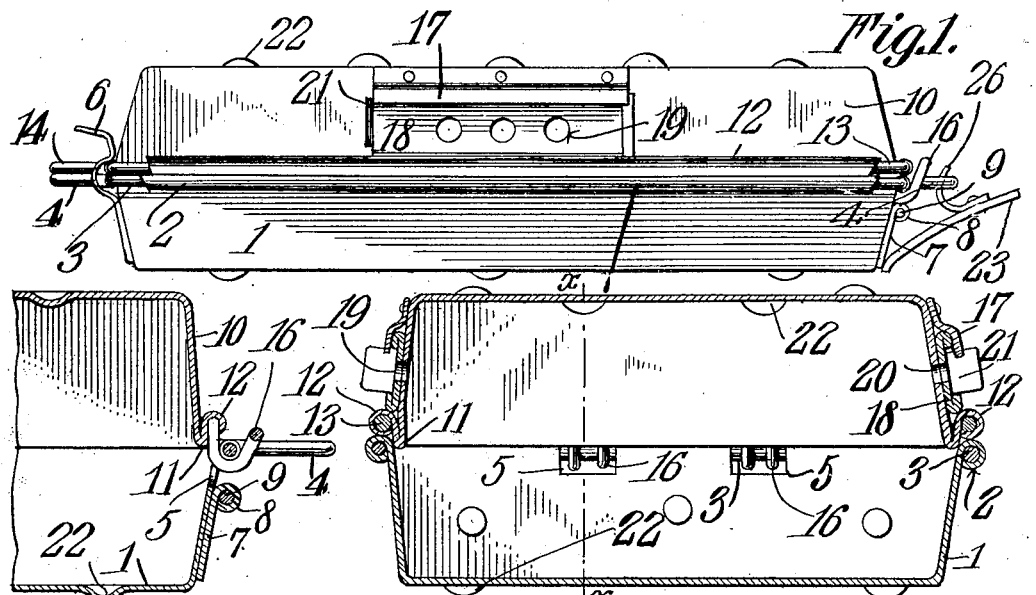
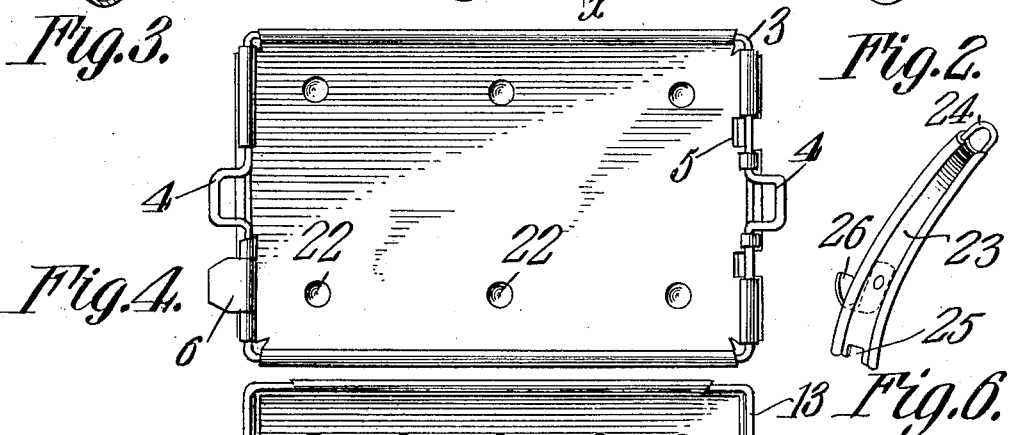
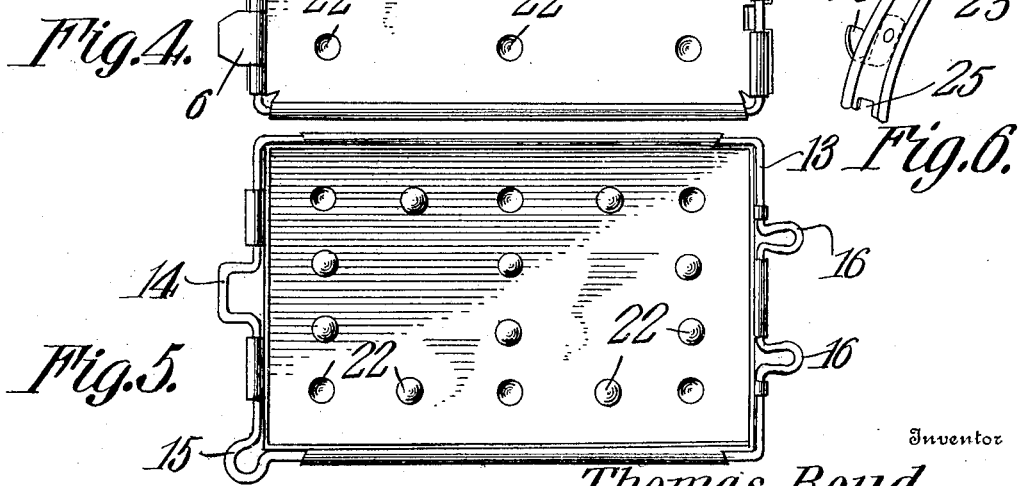
Witnesses
Inventor
Thomas Boyd,
By C. A. Snow & Co.
Attorneys

UNITED STATES PATENT OFFICE.

THOMAS BOYD, OF CLEVELAND, OHIO.

BAKING-PAN.

No. 882,094.  Specification of Letters Patent.  Patented March 17, 1908.

Application filed September 17, 1907. Serial No. 393,271.

*To all whom it may concern:*

Be it known that I, THOMAS BOYD, a citizen of the United States, residing at Cleveland, in the county of Cuyahoga and State of Ohio, have invented a new and useful Baking-Pan, of which the following is a specification.

This invention relates to baking pans and its object is to improve the construction of devices of this character and to provide means whereby the cover of the pan can be quickly and securely fastened in position.

Another object is to provide means whereby the pan can be conveniently handled while the cover is in position and without danger of displacing the cover.

A still further object is to provide novel means whereby the escape of heat, steam, etc. from the pan can be controlled.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of the pan, a lifting device for use in connection therewith being shown in position. Fig. 2 is a central transverse section through the pan. Fig. 3 is a longitudinal section through one end thereof and on the line x—x, Fig. 2. Fig. 4 is a plan view of the bottom of the pan. Fig. 5 is a plan view of the top inverted. Fig. 6 is a detail view of the lifter.

Referring to the figures by characters of reference, 1 designates a pan preferably formed of sheet metal and having its edges rolled outward to form beads 2 through which extends a reinforcing wire 3. Those portions of the wire extending along the ends of the pan are provided at their centers with outstanding U-shaped loops 4 and formed within one end of the pan adjacent opposite sides of the adjoining loop 4 are notches or slots 5 across which the wire 3 extends. A spring catch 6 is connected to the other end of the pan close to the adjoining loop 4 and is for the purpose hereinafter set forth. Reinforcing plates 7 are secured to the ends of the pan and each is preferably provided along its upper edge with a bead 8 through which extends a reinforcing wire 9. A cover 10 is used in connection with the pan and is also preferably formed of sheet metal and has its edge portions folded upon themselves to form flanges 11 and then rolled outward to form beads 12 through which a reinforcing wire 13 extends. Flanges 11 extend below the beads 12 and are designed to fit snugly within the upper portion of the pan 1. That portion of the wire 13 extending across one end of the cover is bent outward at the center to form a U-shaped loop 14 similar to the loops 4 and at one corner of the pan the wire is bent outward to form an eye 15 by means of which the cover can be readily suspended from a supporting rail or hook. That portion of the wire 13 extending across the other end of the cover has two similar outstanding loops 16 which are hook shape and are designed to fit within the notches or slots 5 and to engage those portions of the wire 3 extending across the notches.

A guide strip 17 is secured to each side of the cover and parallel with the adjoining bead 12 and mounted between said bead and strip is a slide 18 having a plurality of openings 19 therein designed to register with corresponding openings 20 in the cover of the pan. Each slide is retained as well as guided by the strip 17 and side beads 12 and has an outstanding portion 21 at one end constituting a handle whereby the slide can be conveniently manipulated. For the purpose of supporting the pan above the bottom of the oven and to facilitate basting suitably located projections 22 are formed with the pan and cover.

When it is desired to secure the cover upon the pan hooks 16 are inserted into the slots or notches 5 as seen in Fig. 1 and the opposite end of the cover is then swung downward so that the beads thereon will be engaged by catch 6. By manipulating the slots 18 heat within the pan can be regulated. By providing a tool such as shown in Figs. 1 and 6 the pan can be conveniently raised or moved into any desired positions. This tool consists merely of a metal strip 23 reinforced along its longitudinal edges by a looped wire 24 which is held in place by folding the edges of the strip 23 thereover. This strip gradually tapers toward one end and its broad end is notched so as to form fingers 25 designed to bear against the pan when the lifter is in use. A hook 26 extends from one face of the strip 23 and is designed to engage the loops 4 and 14 while the fingers 25 bear against the pan.

What is claimed is:

In a device of the character described the combination with a pan having beads along the edges thereof and a reinforcing device extending continuously through the beads, said device having integral outstanding loops extending beyond the ends of the pan and rigid in relation thereto, there being a notch in one wall of the pan intersected by the reinforcing device; of a cover having edge beads, a reinforcing device extending continuously through the beads and having an integral outstanding loop disposed to register with either loop of the pan and to contact therewith throughout its length, said reinforcing device also having integral hooks disposed to project into the notches and to engage those portions of the pan reinforced within the notches, and means adjacent one of the loops of the pan for engaging a bead of the cover to lock the loops in contact.

In testimony that I claim the foregoing as my own, I have hereto affixed my signature in the presence of two witnesses.

THOMAS BOYD.

Witnesses:
   CHAS. HACKMAN,
   LOUIS FESTNER.